US006050826A

United States Patent [19]
Christianson et al.

[11] Patent Number: 6,050,826
[45] Date of Patent: Apr. 18, 2000

[54] INFANT SIMULATION DEVICE AND METHOD THEREFORE

[75] Inventors: Daniel C. Christianson; Judith M. Johnson, both of Jefferson; Roger E. Lidicker, Fort Atkinson, all of Wis.

[73] Assignee: Nasco International, Inc., Fort Atkinson, Wis.

[21] Appl. No.: 08/879,346

[22] Filed: Jun. 20, 1997

[51] Int. Cl.[7] ................................................. G09B 23/28
[52] U.S. Cl. .......................................... 434/262; 446/297
[58] Field of Search ............................ 446/297; 434/238, 434/262

[56] References Cited

U.S. PATENT DOCUMENTS

| | | | |
|---|---|---|---|
| 2,781,611 | 2/1957 | Bills et al. ................................. | 434/257 |
| 2,818,678 | 1/1958 | Lemelson .................................. | 46/118 |
| 3,136,089 | 6/1964 | Gardel et al. .............................. | 46/232 |
| 3,234,687 | 2/1966 | Elwell ....................................... | 46/117 |
| 3,514,899 | 6/1970 | Bonanno et al. .......................... | 46/232 |
| 3,641,703 | 2/1972 | Tepper et al. ............................. | 446/295 |
| 3,755,960 | 9/1973 | Tepper et al. ............................. | 446/299 |
| 3,758,983 | 9/1973 | Cagen ....................................... | 446/306 |
| 3,918,199 | 11/1975 | De Masi .................................. | 446/301 |
| 4,075,782 | 2/1978 | Neuschatz ................................ | 446/295 |
| 4,160,338 | 7/1979 | Lyons et al. .............................. | 446/184 |
| 4,231,184 | 11/1980 | Corris et al. ............................. | 446/175 |
| 4,249,338 | 2/1981 | Wexler ...................................... | 446/297 |
| 4,257,188 | 3/1981 | Barker ...................................... | 46/156 |
| 4,267,551 | 5/1981 | Dankman et al. ........................ | 340/384 |
| 4,318,245 | 3/1982 | Stowell et al. ............................ | 46/232 |
| 4,451,911 | 5/1984 | Klose et al. .............................. | 396/31 |
| 4,575,351 | 3/1986 | Gonzalez ................................. | 446/371 |
| 4,696,653 | 9/1987 | McKeefery .............................. | 446/175 |
| 4,717,363 | 1/1988 | Refabert ................................... | 446/14 |
| 4,740,186 | 4/1988 | Sirota ....................................... | 446/14 |
| 4,809,335 | 2/1989 | Rumsey .................................... | 381/53 |
| 4,840,602 | 6/1989 | Rose ......................................... | 446/175 |
| 4,857,030 | 8/1989 | Rose ......................................... | 446/303 |
| 4,915,635 | 4/1990 | Ingenito et al. .......................... | 434/396 |
| 4,923,428 | 5/1990 | Curran ...................................... | 446/175 |
| 5,011,449 | 4/1991 | Handy et al. ............................. | 446/297 |
| 5,079,538 | 1/1992 | DeFino et al. ........................... | 340/426 |
| 5,083,962 | 1/1992 | Pracas ....................................... | 446/184 |
| 5,083,965 | 1/1992 | Mayem ..................................... | 446/305 |
| 5,092,811 | 3/1992 | Bergenguer .............................. | 446/301 |
| 5,094,644 | 3/1992 | Kelley ...................................... | 446/305 |
| 5,096,424 | 3/1992 | Carlberg .................................. | 434/262 |
| 5,281,180 | 1/1994 | Lam et al. ................................ | 446/175 |
| 5,290,198 | 3/1994 | Nakayama ............................... | 446/297 |
| 5,314,336 | 5/1994 | Diamond et al. ........................ | 434/169 |
| 5,353,015 | 10/1994 | Robinson ................................ | 340/686 |
| 5,443,388 | 8/1995 | Jurmain et al. .......................... | 434/238 |
| 5,471,192 | 11/1995 | Dash ....................................... | 340/384.3 |
| 5,509,810 | 4/1996 | Schertz et al. ........................... | 434/262 |
| 5,612,675 | 3/1997 | Jennings .................................. | 340/573 |
| 5,627,520 | 5/1997 | Grubbs et al. ........................... | 340/572 |
| 5,695,381 | 12/1997 | Truchsess ................................ | 446/297 |

FOREIGN PATENT DOCUMENTS

| | | |
|---|---|---|
| 0032843 | 1/1981 | European Pat. Off. . |
| 0549840A1 | 7/1993 | European Pat. Off. . |
| 2196545 | 5/1988 | United Kingdom .................. 446/295 |

OTHER PUBLICATIONS

"Baby Think It Over" 1997 Catalog, Baby Think It Over, Inc., 1519 Peterson Avenue, Eau Claire, WI 54703.

*Primary Examiner*—Jessica J. Harrison
*Assistant Examiner*—David A Fleming
*Attorney, Agent, or Firm*—Andrus, Sceales, Starke & Sawall

[57] ABSTRACT

A device and method is provided for simulating the activities of an infant. The invention includes a mannequin having a simulator position therein for generating a plurality of simulated activities by the mannequin at preprogrammed timed intervals. Simulated duties such as diaper change, feeding and burping, and attention are generated by the simulator. A user must respond by inserting a proper response element into the simulator in order to terminate the simulated activity. Indicators are provided to inform of the user's abuse or tampering with the simulator.

60 Claims, 5 Drawing Sheets

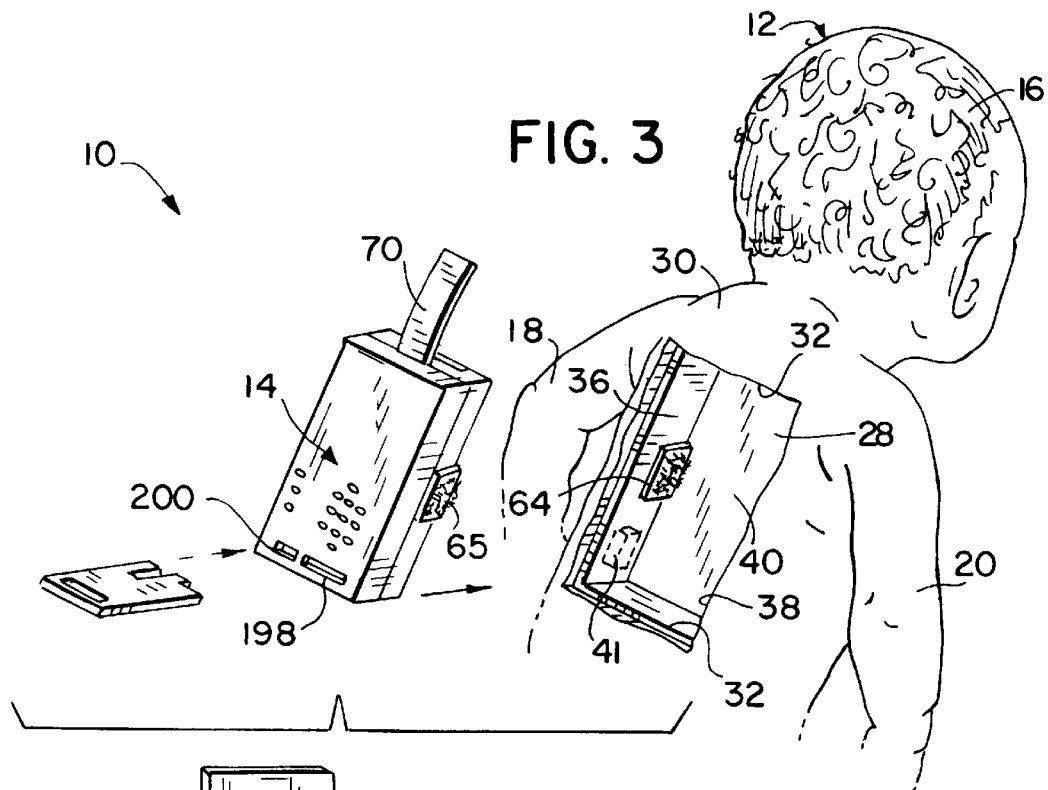
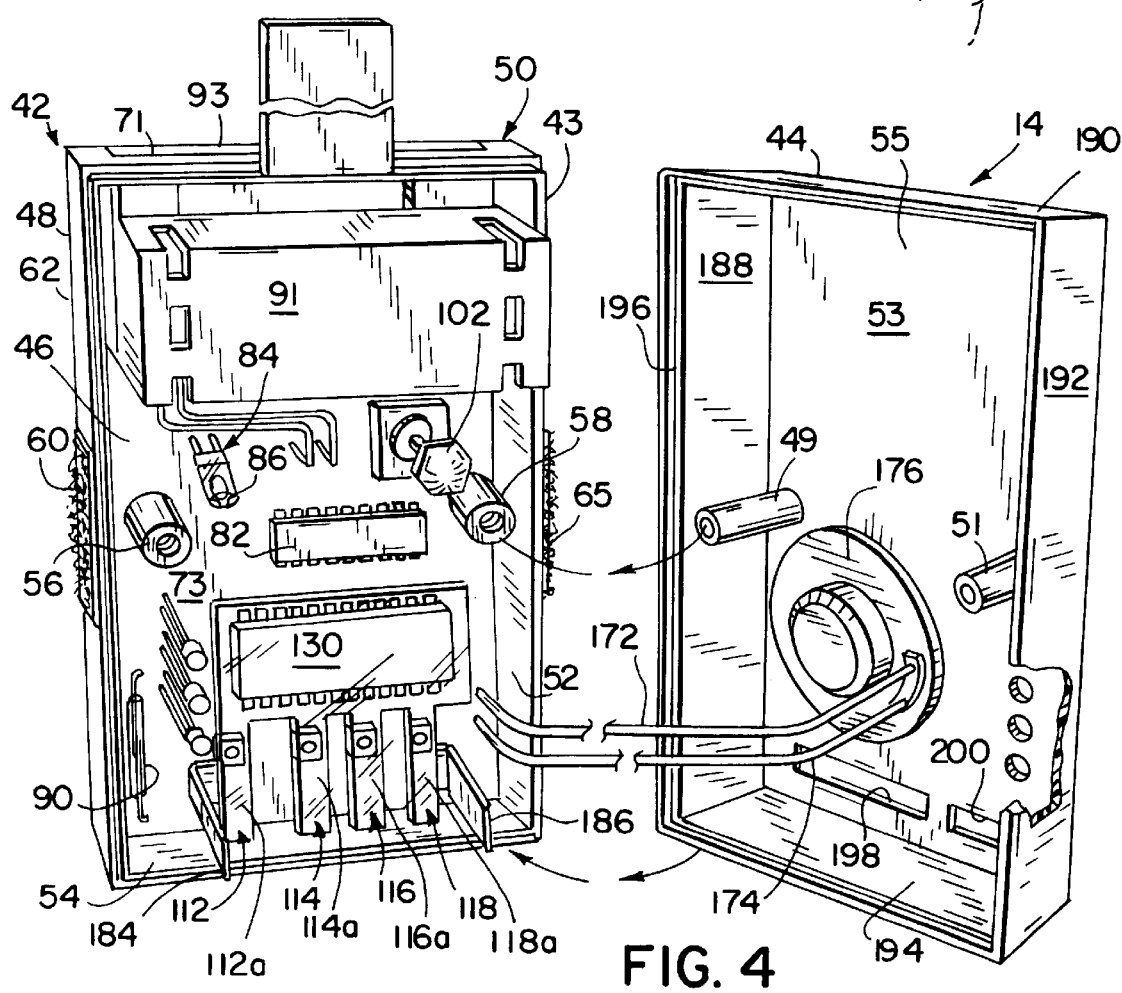

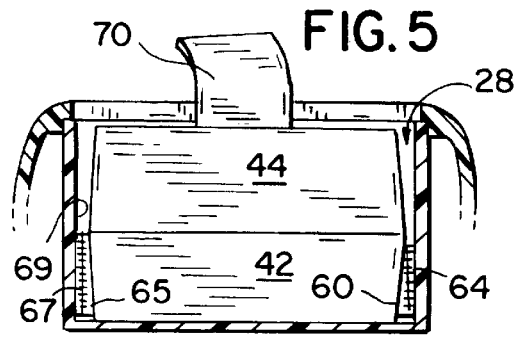
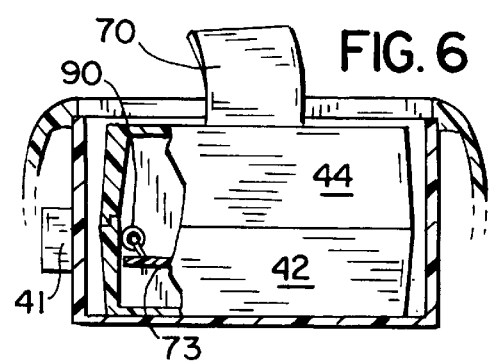
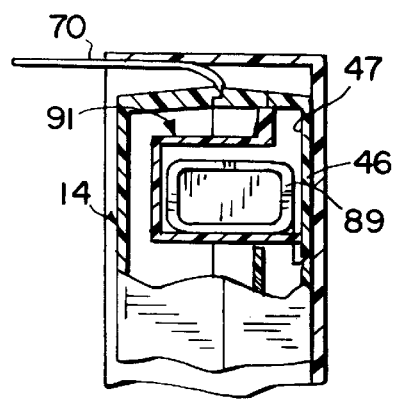
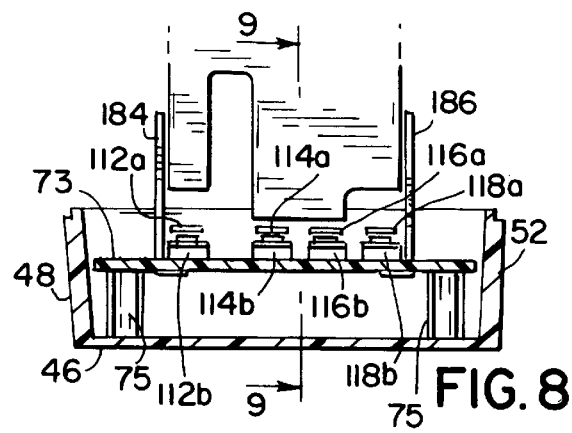
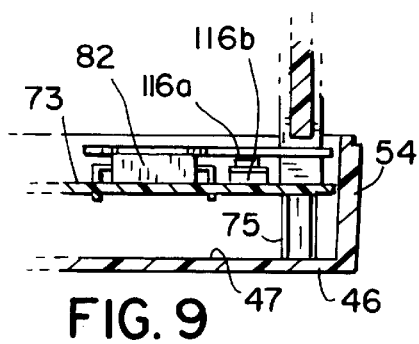
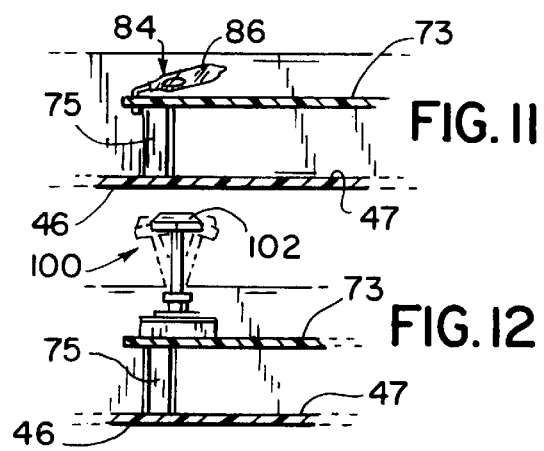
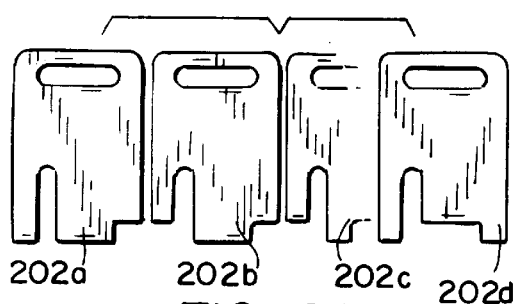
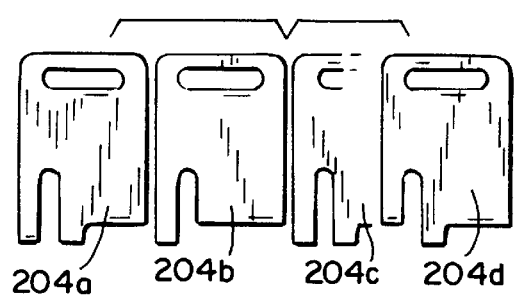

INFANT SIMULATION DEVICE AND METHOD THEREFORE

BACKGROUND AND SUMMARY OF THE INVENTION

This invention relates generally to mannequins, in particular, to a mannequin which simulates the activities of an infant in order to teach potential parents about the realities of parenthood.

Potential parents, such as teenagers, often fail to appreciate the rigors and realities of parenthood. As is known, parenting involves a great deal of time and energy. The demands for caring for a baby keep a parent on duty twenty-four hours a day, seven days a week. As a result, it is highly desirable to teach potential parents, especially teenagers, the many aspects of caring for an infant.

Heretofore, in order to teach individuals the realities and rigors of parenthood, infant simulation systems have been developed. For example, in Jurmain et al U.S. Pat. 5,443,388, an infant care simulation system is provided for use in teaching individuals the realities, responsibilities and constraints inherent in carrying for young babies. While the system described in the Jurmain et al '388 patent adequately simulates the crying of an infant, there are significant limitations which minimize the effectiveness of the Jurmain system for use as an educational tool for teaching individuals the realities and rigors of parenthood, and also the positive effects of parenthood.

In the system described in the Jurmain et al '388 patent, the infant cries at random intervals and for random lengths of time thereby demanding a response from the user. As such, monitoring by an instructor of a student'response to the simulated activities is difficult when the simulation system is removed from the instructor's presence. Consequently, methodology for recording the student's responses must be provided in the simulation system to monitor the activities of the student. A device or element for recording the student's responses may add significantly to the cost of the simulation system.

Further, prior art simulation systems typically do not include an element for monitoring the possible abuse thereof. In that infants are fragile and activities such as the shaking or dropping of an infant can cause permanent damage thereto, it is highly desirable to monitor this type of activity in order for instructors to assist a student with a potential problem and to discourage such activities by the student with an actual infant. Also, simulation systems such as the one described in the Jurmain et al '388 patent can be expensive to manufacture. Therefore, it is desirable to monitor the activities of the end user of the simulation system in order to minimize the potential damage thereto.

In addition, there are additional aspects to tending for an infant which are not provided for in prior art simulation systems. For example, it is often times difficult for a parent to know why an infant cries. As a result, it is highly desirable to develop a simulation system in which the student is required to determine the nature of the infant's crying.

Therefore, it is a primary object and feature of the present invention to provide an infant simulation device which teaches potential parents of the realities and rigors of parenthood.

It is a further object and feature of the present invention to provide an infant simulation device which may be used as an educational tool for teaching individuals the realities and rigors of parenthood.

It is a still further object and feature of the present invention to provide an infant simulation device which simulates a plurality of activities of an infant at predetermined time periods.

It is a still further object and feature of the present invention to provide an infant simulation device wherein a user's responses to the activities simulated by the device are easily monitorable.

It is a further object and feature of the present invention to provide an infant simulation device which monitors the possible abuse and/or tampering of the same.

It is a still further object and feature of the present invention to provide an infant simulation device which requires the user to determine the nature of the simulated activities generated by the device.

In accordance with the present invention, a device is provided for simulating the activities of an infant. The device includes a mannequin and a control module positioned within the mannequin for generating one of a plurality of simulated activities by the mannequin at predetermined time intervals. The device also includes a plurality of response elements. Each response element corresponds to a distinct, corresponding simulating activity. A reader element is operatively connected to the control module for receiving a response element therein. The control module terminates the one of a plurality of simulated activities in response to receiving the proper, response element within the reader element, and thereafter generate positive feedback to the user to indicate a correct action has taken.

The device further includes an abuse indicator interconnected to the mannequin. The abuse indicator generates a signal in response to a predetermined force on the mannequin. The abuse indicator includes a toggle switch movable between a first, normal operating position and a second, abuse position in response to a predetermined force on the mannequin. A light emitting diode is provided for generating a visual signal in response to the moving of the toggle switch to the second, abuse position. In addition, a sound generator is provided for generating an audible abuse signal in response to the moving of the toggle switch into the second, abused position. One of the plurality of response elements constitutes an attention element, wherein receipt of the attention element within the reader element terminates the audible abuse signal after a predetermined period.

One of the plurality of response elements constitutes a panic element. Receipt of the panic element within the reader element terminates any of the simulated activities generated by the control module, however, the program will continue. In addition, the control module generates a panic signal in response to receipt of the panic element within the reader element.

A control module is powered by a power source, such as a battery. A low power indicator is operatively connected to the power source. The lower power indicator generates a visual signal if the power supplied by the power source decreases below a predetermined level.

The device of the present invention further includes a tamper indicator interconnected to the control module for generating a tamper signal if the control module is removed from the mannequin. The tamper indicator includes a tamper switch movable between a first, normal operating position, and a second, tampered position in response to the unauthorized removal of the control module from the mannequin. The tamper indicator also includes a light emitting diode for generating a signal in response to the moving of the tamper switch to the tampered position.

The control module of the infant simulation device of the present invention includes a microprocessor and sound generating structure responsive to commands from the microprocessor. The reader element includes a plurality of switches operatively connected to the microprocessor of the control module. Each switch is movable between an open and a closed position. Each response element includes a key having distinct, coded bitting thereon. By inserting a response element into the reader element, the coded bitting closes a unique, corresponding combination of switches of the reader element. This, in turn, provides a unique, corresponding signal to the microprocessor.

The control module and the reader element are housed in a housing. The housing has a slot therein so as to allow for insertion of a response element. The housing is positioned within a cavity in the mannequin. A hook and pile element is utilized to maintain the housing within the cavity. A flexible tab member extends from the housing so as to facilitate removal of the housing from the mannequin.

Finally, a sensor is provided for monitoring the position of the mannequin and for providing a signal to the control module in response to the positioning of the mannequin in a predetermined, non-acceptable position. In response to the signal generated by the sensor, the control module generates an audio signal to indicate the positioning of the mannequin in a non-acceptable position.

In accordance with the present invention, a method is also provided for simulating activities of an infant. The method includes providing a mannequin and generating one of a plurality of simulated activities by the mannequin at predetermined time intervals. A response element is selected corresponding to the simulated activity in order to terminate the simulated activity by the mannequin.

The method of the present invention may also include the additional step of generating a visual signal in response to a predetermined force on the mannequin. Further, an audible signal may be generated in response to a predetermined force on the mannequin. The audible signal may be terminated with a selected response element.

The method contemplates providing a panic element and generating a signal with the panic element so as to terminate any of the simulated activities by the mannequin. If an activity is terminated by a panic element, the method contemplates generating a panic signal in response thereto so as to indicate to an instructor use of the same.

Power is supplied for generating the simulated activities by the mannequin. The method contemplates monitoring the power supplied and generating a signal in response to the power decreasing below a predetermined level.

The plurality of simulated activities by the mannequin are performed according to a program. It is contemplated that a plurality of programs may be constructed, with an instructor having the ability to select a desired program for generating the simulated activities.

BRIEF DESCRIPTION OF THE PREFERRED EMBODIMENT

The drawings furnished herewith illustrate a preferred construction of the present invention in which the above advantages and features are clearly disclosed as well as others which will be readily understood from the following description of the illustrated embodiment.

In the drawings:

FIG. 3 is an exploded, rear elevational view showing a portion of the infant simulation device of FIG. 2;

FIG. 4 is an exploded, front elevational view of the simulator of the infant simulation device of the present invention;

FIG. 5 is a bottom plan view, partially in section, showing the simulator of FIG. 4 installed within the infant simulation device of the present invention; FIG. 6 is a bottom plan view, similar to FIG. 5, with portions broken away, showing the simulator of FIG. 4 installed within the infant simulation device of the present invention;

FIG. 7 is a side elevational view, with portions broken away, showing the simulator of FIG. 4 installed within the infant simulation device of the present invention;

FIG. 8 is a cross-sectional view of the simulator of FIG. 4 and a key element for use therewith;

FIG. 9 is a cross-sectional view of the simulator of FIG. 8 taken along line 9—9;

FIG. 10a is a side elevational view showing a plurality of program key elements for use in connection with the infant simulation device of the present invention;

FIG. 10b is a side elevational view showing a plurality of response key elements for use in connection with the infant simulation device of the present invention;

FIG. 11 is a cross-sectional view of a portion of the simulator incorporated into the present invention showing a position switch for use therewith;

FIG. 12 is a cross-sectional view of a portion of the simulator incorporated into the present invention showing an abuse switch for use therewith;

BRIEF DESCRIPTION OF THE ILLUSTRATED EMBODIMENTS

Figures 1, 2:
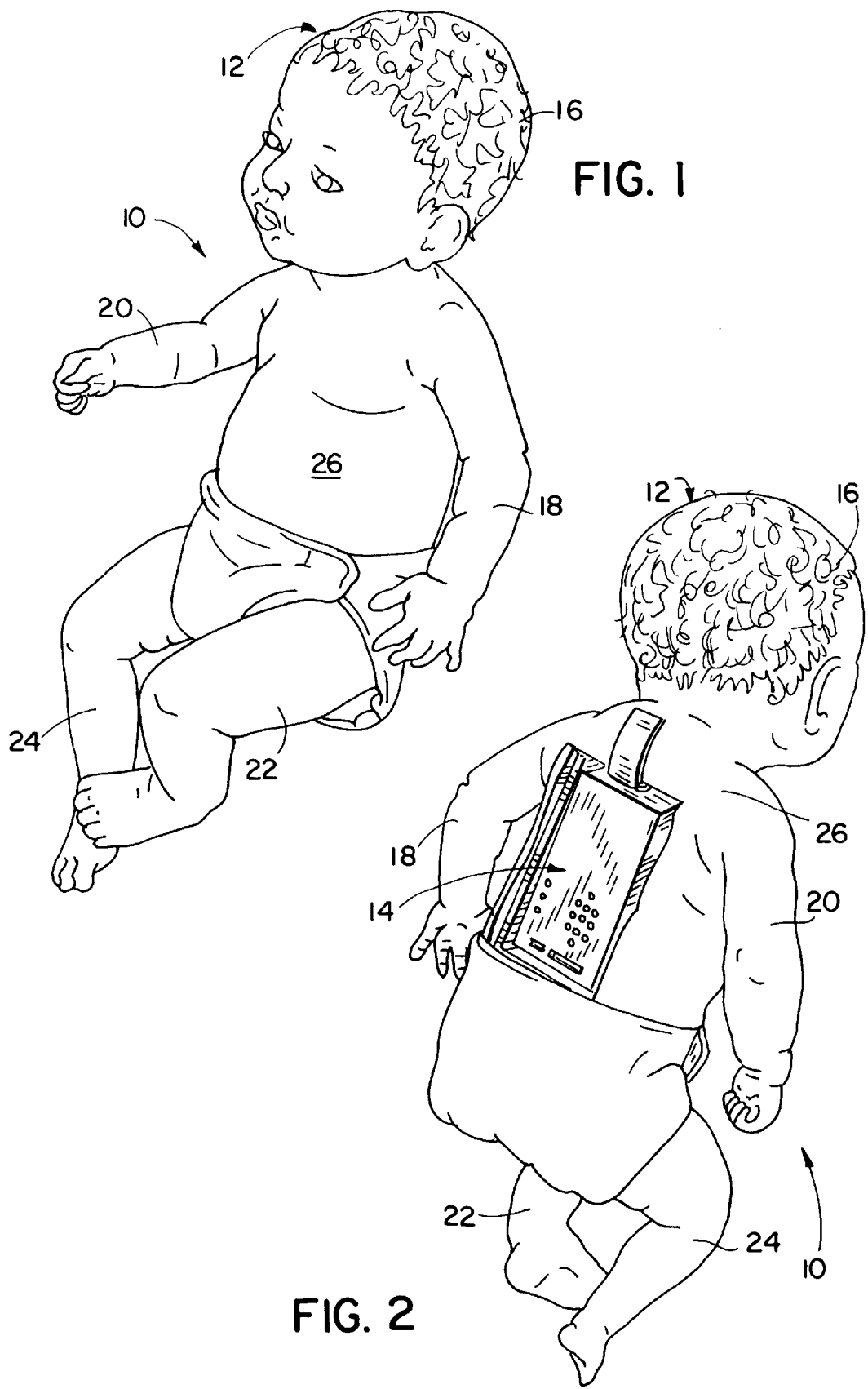
FIG. 1 is an isometric view of an infant simulation device in accordance with the present invention.
FIG. 2 is a rear elevational view of the infant simulation device of FIG. 1.

Referring to FIGS. 1–3, the infant simulation device of the present invention is generally designated by the reference numeral 10. Infant simulation device 10 includes a mannequin 12 and a simulator 14 mounted therein. As is shown, mannequin 12 is in the form of a young, anatomically correct infant. It is contemplated that mannequin 12 may incorporate any selected ethnic characteristic or be of either sex.

Mannequin 12 includes a head 16, first and second arms 18 and 20, first and second legs 22 and 24, and a torso 26. A simulator receipt cavity 28 is formed in the back 30 of torso 26. Cavity 28 is defined by upper and lower walls 32 and 34, respectively, sidewalls 36 and 38, and recessed wall 40. As best seen in FIGS. 2 and 5–7, cavity 28 is dimensioned so as to receive simulator 14 therein. A magnet 41 is mounted to the outside of sidewall 36, for reasons hereinafter described.

Figure 13:
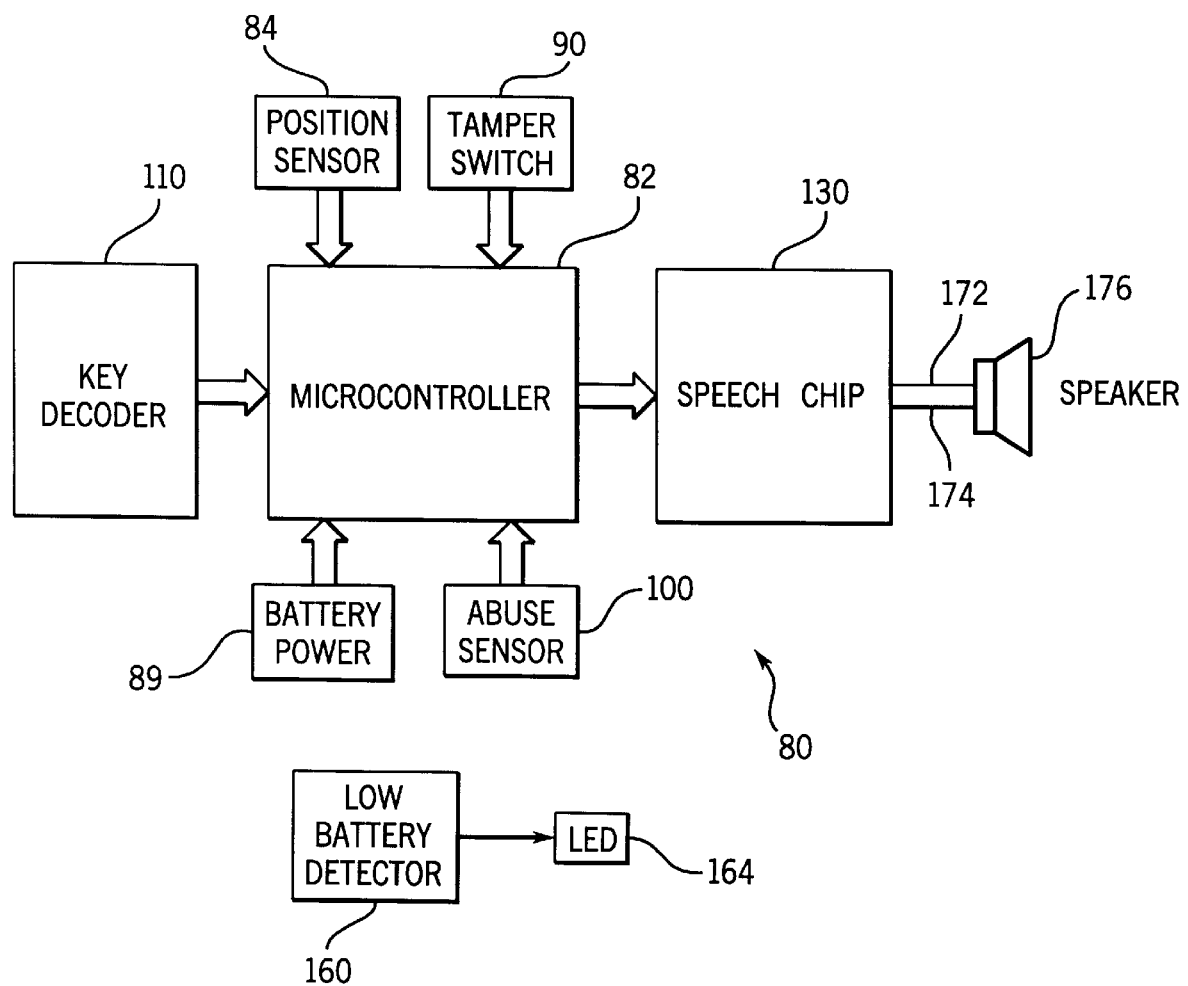
FIG. 13 is a block diagram showing the electronic circuitry of the simulator incorporated into the present invention.
Figure 14:
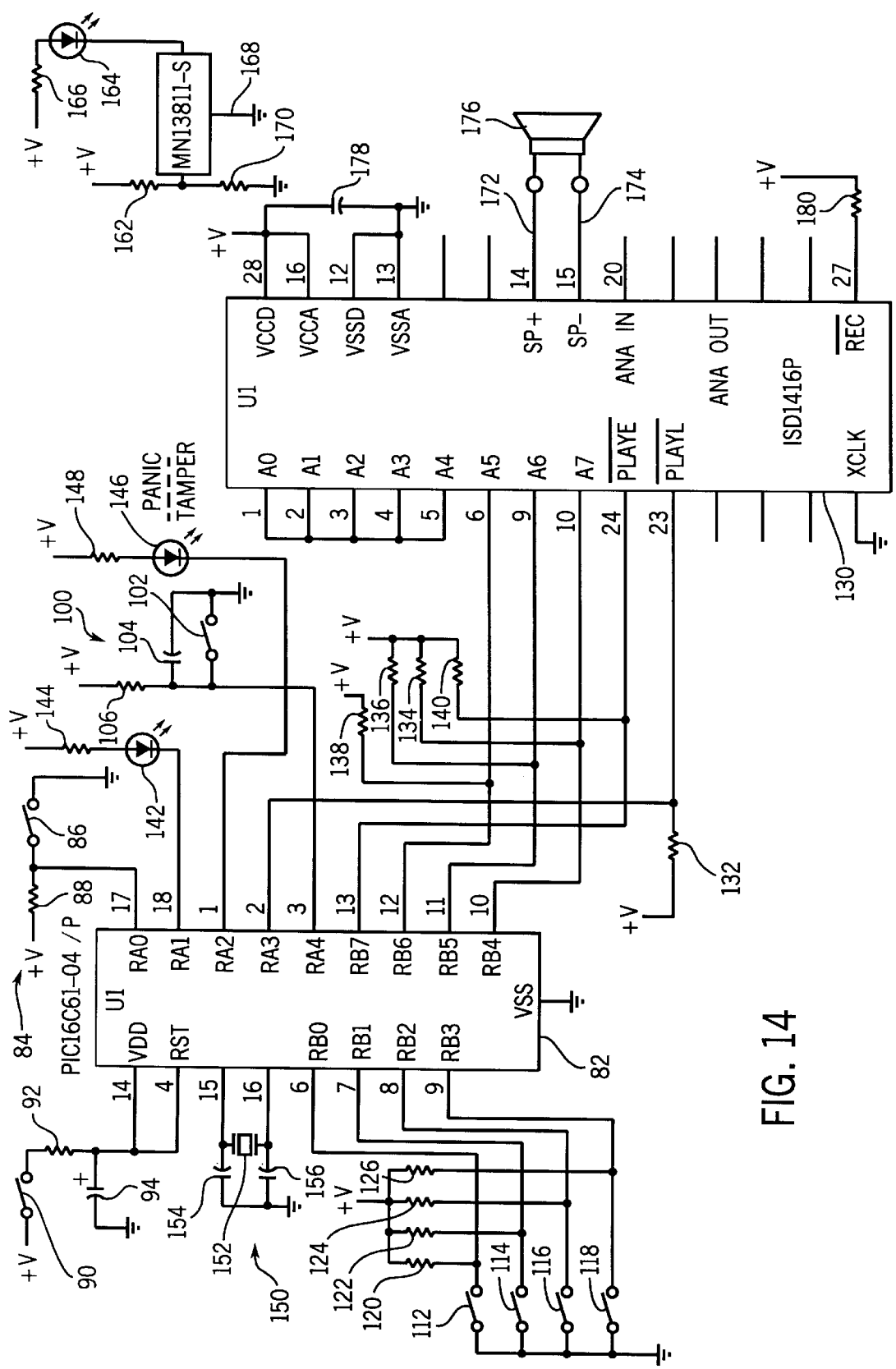
FIG. 14 is an electrical schematic of the simulator incorporated into the present invention.

Referring to FIG. 4, simulator 14 includes first 42 and second 44 housing portions which house the electronic circuitry shown and described in FIGS. 13–14. First housing portion 42 includes a forward wall 46 and sidewalls 48, 50, 52 and 54 so as to define a box-like structure. A rib 43 extends along sidewalls 48, 50, 52 and 54 in order to facilitate the joining of first 42 and second 44 housing portions. First 56 and second 58 mounting elements project rearwardly from the inner surface 47 of forward wall 46 and are positioned so as to align with mounting elements 49 and 51 which project forwardly from the inner surface 53 of rear wall 55 of second housing portion 44.

One of a hook and pile element is affixed to the outer surface 62 of sidewall 48 of first housing portion 42, while the other 64 is affixed to the inner surface of sidewall 36 of cavity 28. Similarly, one 65 of a hook and pile element is affixed to the outer surface 66 of sidewall 52 of first housing element 42, while the other 67 is affixed to the inner surface 69 of sidewall 38 of cavity 28 in mannequin 12. As best seen in FIG. 5, the hook and pile elements are used to secure simulator 14 within cavity 28 of mannequin 12. First housing portion 42 also includes a flexible tab member 70 extending from the outer surface 71 of sidewall 50 in order to facilitate the removal of simulator 70 from cavity 28, as hereinafter described.

Simulator 14 also includes electronic circuitry for generating predetermined simulated activities by the infant simulation device 10. Electronic circuitry 80 is supported within simulator 14 on a circuit board 73 which is interconnected to and spaced from the forward wall 46 of first housing portion 42 by circuit board supports 75. Referring to FIG. 13, a block diagram of the electronic circuitry housed in the simulator 14 is provided. The electronic circuitry of the simulator 14 is generally designated by the reference number 80. Referring to FIGS. 4, 13 and 14, electronic circuitry 80 includes a microcontroller 82 mounted to circuit board 73 of first housing portion 42, FIG. 9. In the preferred embodiment, microcontroller 82 is a microprocessor such as Motorola Part No. PIC16C61-04/P which is programmed for running four different event programs which determine the simulated activities performed by device 10.

Circuitry 80 also includes a position sensor 84 and a tamper switch 90 which are operatively connected to microcontroller 82. Position sensor 84 is mounted to circuit board 73 within first housing portion 42, FIG. 11, and includes a mercury switch 86 which has a first end connected to pin 17 of microcontroller 82 and a second end connected to ground, FIG. 14. Pin 17 is also connected through resistor 88 to a voltage source +V such as battery 89.

Referring to FIG. 7, battery 89 is supported within simulator 14 by battery support structure 91. A removable panel 93 is provided in the forward wall 46 of first housing portion 42 of simulator 14 in order to allow access to battery 89 within battery support structure 91.

Tamper switch 90 comprises a magnetic switch mounted to circuit board 73 within first housing member 42, FIGS. 2 and 6. Tamper switch 90 has a first end interconnected to pins 4 and 14 of microcontroller 82 through resistor 92, FIG. 14. A second end of tamper switch 90 is connected to voltage source +V. Pins 14 and 4 are also connected to ground through capacitor 94.

Circuitry 80 further includes an abuse sensor 100 having a toggle switch 102 mounted to circuit board 73 of first housing member 42, FIG. 12. Toggle switch 102 has a first end connected to ground and a second end connected to pin 3 of microcontroller 82, FIG. 14. A capacitor 104 is mounted in parallel with toggle switch 102. The second end of toggle switch 102 is also connected to voltage source +V through resistor 106.

Key decoder 110 includes first 112, second 114, third 116, and fourth 118 switches, FIG. 4. Each switch 112, 114, 116, 118 includes a flexible read portion 112*a*, 114*a*, 116*a*, 118*a*, respectively, resiliently spaced from a corresponding contact switch 112*b*, 114*b*, 116*b*, 118*b*, respectively. Each contact switch 112*b*, 114*b*, 116*b*, 118*b* is mounted to and supported by circuit board 73. Each contact switch 112*b*, 114*b*, 116*b*, 118*b* has a first end interconnected to a corresponding pin 6, 7, 8 and 9, respectively, of microcontroller 82 and a second end connected to ground. Further, each first end of contact switches 112*b*, 114*b*, 116*b*, 118*b* is interconnected to voltage source +V through a corresponding resistor 120, 122, 124, 126, respectively.

Pins 2, 10, 11, 12 and 13 of microcontroller 82 are interconnected to corresponding pins 23, 10, 9, 6, and 24, respectively, of a speech chip 130 thereby allowing microcontroller 82 to control the output of speech chip 130 at pins 14 and 15. It is contemplated that speech chip 130 be of the type sold by ISD under the Model Number 1416P. Pins 2, 10, 11, 12, 13 are also connected through corresponding resistors 132, 134, 136, 138, 140, respectively, to voltage source +V.

Microcontroller 82 is also connected to voltage source +V at pin 18 through abuse LED 142 and resistor 144 which are in series. Similarly, pin 1 of microcontroller 82 is connected to voltage source +V through panic/tamper LED 146 and resistor 148 which are in series. The timing of microcontroller 82 is controlled by an external oscillator circuit 150 which includes an oscillator 152 having first and second ends connected to ground through corresponding capacitors 154 and 156, respectively, as is conventional.

Circuitry 80 further includes a low battery detector 160 such as Model No. MN13811-S. Battery detector 160 is connected to voltage source +V through resistor 162 and through a low battery LED 164 and resistor 166 combination which are connected in series. Low battery detector 160 is also connected directly to ground through line 168 and through resistor 170.

Pins 14 and 15 of speech chip 130 are interconnected through lines 172 and 174, respectively, to speaker 176 so as to allow speech chip 130 to generate sound therethrough. As best seen in FIG. 4, speaker 176 is mounted to the inner surface 53 of rear wall 55 of second housing portion 44. Pins 16 and 28 of speech chip 130 are tied together, and thereafter interconnected to voltage source +V, and through capacitor 178, to ground. Pins 1–5 of speech chip 130 are tied together, while pins 12 and 13 of speech chip 130 are tied together and also tied to ground. Pin 27 of speech chip 130 is connected to voltage source +V through resistor 180, and speech chip 130 is grounded at pin XCLK.

Also mounted to circuit board 73 are first 184 and second 186 key guide elements, FIGS. 4 and 8, which project rearwardly from circuit board 73. Key guide elements 184 and 186 are laterally spaced in order to accommodate a key element therebetween.

Second housing portion 44 is defined by rear wall 55 and sidewalls 188, 190, 192 and 194. A groove 196 extends along the edges of walls 188, 190, 192 and 194 and is adapted for receiving rib 43 therein.

In an assembled condition, rib 43 of first housing portion 42 is received within groove 196 of second housing portion 44. In order to interconnect first 42 and second 44 housing portions of simulator 14, a screw is threaded through mounting element 49 of second housing portion 44 and into first mounting element 56 of first housing portion 42. Similarly, a screw is threaded through mounting element 51 of second housing portion 44 and into second mounting element 58 of first housing portion 42. Simulator 14 is then inserted into cavity 28 such that the hook and pile elements described above maintain simulator 14 within cavity 28, FIG. 5. As best seen in FIGS. 2 and 5–6, flexible tab member 70 is positioned so as to project outwardly from cavity 28 in order to facilitate removal of simulator 14 from cavity 28.

Rear wall 55 of second housing portion 44 of simulator 14 includes first and second slots 198 and 200 which are adapted for receiving program keys 202a–d, FIG. 10a, and/or various response keys, for example 204a–d, FIG. 10b, therein. Each key 202a–b and 204a–b includes a distinct coded end which engages a unique combination of flexible read portions 112a, 114a, 116a, 118a of switches 112, 114, 116 and 118, respectively, so as to close corresponding contact switches 112b, 114b, 116b and 118b, respectively. This, in turn causes the pins 6, 7, 8, 9 of microcontroller 82 which are interconnected to the contact switches 112a, 114a, 116a, 118a which have been closed to a change state, thereby providing a unique, corresponding digital signal at pins 6, 7, 8, 9 of microcontroller 82. As a result, each key inserted into slots 198 and 200 generates a unique, corresponding digital signal to microcontroller 82. Based upon this digital signal, microcontroller 82 determines if the proper responses have been provided by a user to the programmed events generated by the electronic circuitry 80 of simulator 14, as hereinafter described.

In a preferred construction, microcontroller 82 may be programmed for running four distinct event programs. Each event program consists of three types of programmed events: diaper change, feeding and burping, and attention. In the preferred construction, there are three programs that can be selected by an instructor plus a demonstration option. A sample program is shown below:

| Time | Time from Last Event | Event | Duration In Minutes |
|---|---|---|---|
| 0:00 | 0 minutes | Reset | 0 |
| 0:20 | 20 minutes | Diaper change (1) | 5 |
| 3:55 | 215 minutes | Feeding & Burping (1) | 30 |
| 5:48 | 108 minutes | Attention (1) | 15 |
| 6:22 | 34 minutes | Diaper change (2) | 5 |
| 8:46 | 144 minutes | Feeding & Burping (2) | 30 |
| 9:58 | 72 minutes | Diaper change (3) | 5 |
| 12:49 | 171 minutes | Feeding & Burping (3) | 30 |
| 13:40 | 51 minutes | Attention (2) | 15 |
| 17:55 | 255 minutes | Feeding & Burping (4) | 30 |
| 18:42 | 47 minutes | Diaper change (4) | 6 |
| 22:30 | 228 minutes | Feeding & Burping (5) | 30 |
| 24:52 | 142 minutes | Diaper change (5) | 5 |
| 26:35 | 95 minutes | Attention (3) | 15 |
| 27:49 | 74 minutes | Diaper change (6) | 5 |
| 29:32 | 103 minutes | Feeding & Burping (6) | 30 |
| 31:20 | 76 minutes | Diaper change (7) | 5 |
| 32:12 | 52 minutes | Feeding & Burping (7) | 30 |
| 36:50 | 278 minutes | Diaper change (8) | 5 |
| 37:23 | 33 minutes | Feeding & Burping (8) | 30 |
| 39:10 | 107 minutes | Attention (4) | 15 |
| 41:19 | 129 minutes | Diaper change (9) | 5 |
| 43:56 | 157 minutes | Feeding & Burping (9) | 30 |
| 46:21 | 145 minutes | Diaper change (10) | 5 |
| 47:42 | 81 minutes | Feeding & Burping (10) | 30 |

Each program is approximately equal in length and consists of approximately 25 different events. Each of the programs has fixed times at which the events occur. These predetermined times are known to the instructor, but not to the student.

In operation, an instructor selects one of the three above-described programs programmed in microcontroller 82 when assigning a mannequin to a particular student. Each program, as described above, includes a realistic number of times that the simulation system must be fed, burped, diapered or given attention. The programs are selected by the instructor by inserting one of the four program keys 202a–d, FIG. 10a, into slots 198 and 200 of simulator 14 as shown in FIG. 3. As previously described, each program key 202a–d includes a unique coded tab for engaging corresponding read portions 112a, 114a, 116a, and 118a of switches 112, 114, 116, 118, respectively. As best seen in FIG. 8, when a selected program key 202a–d is inserted into slots 198 and 200 in simulator 14, the coded tab of the selected program key engages and depresses a predetermined corresponding read portion(s) 112a, 114a, 116a, 118a of switches 112, 114, 116, 118, respectively, which, in turn, closes a corresponding contact switch 112b, 114, 116b, 118b. By closing a corresponding, predetermined contact switch, a digital signal is sent to microcontroller 82 so as to activate the selected program. If a non-program key is inserted into slots 198 and 200 of simulator 14, nothing will happen. However, if a proper program key 202a–d is inserted, and the program is activated, microcontroller 82 sends a digital signal from pins 2 and 10–13 to speech chip 30. In response to these digital signals, speech chip 130 generates a cooing sound through speaker 176.

Once a program is activated, the microcontroller 82 will cause speech chip 130 to generate a crying sound from speaker 176 at predetermined intervals according to the program selected. For example, at specific times, a crying sound will be generated in order for the infant simulation device 10 to simulate that the infant is wet and wants its diaper changed. The crying will continue until the student inserts the proper response key, i.e. diaper change key 204a, FIG. 10b. If the student inserts any other key, the infant will continue to cry.

Upon insertion of the diaper change key 204a in slots 198 and 200 in simulator 14, a digital signal is sent to microcontroller 82 which, in turn, instructs the speech chip 130 to terminate the crying sound to generate a cooing sound at speaker 176 to indicate that the correct action has been taken. The diaper change period lasts a predetermined time period which students do not know in advance. Ten seconds before the end of diaper change period, the microcontroller 82 instructs the sound chip 130 to generate a cooing sound at speaker 176. The diaper change key 204a must then be reinserted into slots 198 and 200 to end the diaper change period. If the diaper change key 204a is not reinserted, the speech chip 130 will continue to generate a crying sound at speaker 176. After reinsertion of the proper diaper change key 204a, the microcontroller 82 will instruct speech chip 130 to terminate the crying sound and to generate a cooing sound at speaker 176.

At specific times determined by the selected program, microcontroller 82 will instruct speech chip 130 to generate a crying sound at speaker 176 to simulate that the infant is hungry. The crying sound will continue until a student inserts the feed key 204b into slots 198 and 200 in simulator 14. By inserting the proper feed key 204b into slots 198 and 200, a digital signal is provided to microcontroller 82 which, in turn, causes microcontroller 82 to instruct speech chip 130 to terminate the crying sounds and to generate a cooing sound to indicate that the correct action has been taken. However, if a student inserts any other key in slots 198 and 200, the crying sound will continue.

In the preferred embodiment, the feeding period lasts twenty minutes. Students do not know the duration of the feeding period in advance. Ten seconds before the end of the feeding period, microcontroller 82 will instruct speech chip 30 to generate a cooing sound at speaker 176 indicating to the student that the infant needs to be burped. If the burp key 204c, FIG. 10b, is inserted within slots 198 and 200 within the ten second period, the microcontroller 82 will instruct speech chip 130 to generate a cooing sound at speaker 176 so as to indicate the beginning of the burping period. If any other key is entered into slots 198 and 200 or if the burp key 204c is not inserted within ten seconds, microcontroller 82 will instruct speech chip 130 to generate a crying sound at speaker 176 until the burp key 204c is inserted.

The burping period last ten minutes. The duration of the burping period is not known to the students in advance. Ten seconds before the end of the burping period, the microcontroller 82 will instruct speech chip 130 to generate a cooing sound at speaker 176. Thereafter, the burp key 204c must be reinserted into slots 198 and 200 in order to end the burping period. If the burp key 204c is not reinserted into slots 198 and 200, the microprocessor will instruct speech chip 130 to generate a continuous crying sound at speaker 176. When the burp key 204c is inserted into slots 198 and 200, the microcontroller 82 will terminate the burping period and will cause speech chip 130 to generate a cooing sound at speaker 176.

At predetermined times, microcontroller 82 will instruct speech chip 130 to generate a crying sound at speaker 176 in order to simulate that the infant is unhappy and desires attention. The crying sound will continue until a student inserts the proper response key, i.e. attention key 204d, FIG 10b, into slots 198 and 200. If the student inserts any other key into slots 198 and 200, the crying sound will continue. Upon insertion of the attention key 204d into slots 198 and 200, a digital signal is sent to microcontroller 82 which, in turn, instructs speech chip 130 to terminate the crying sound and, thereafter, to generate a cooing sound to indicate to the student that a correct action has been taken.

The attention period lasts fifteen minutes. The duration of the attention period is not known in advance to the students. Ten seconds before the end of the attention period, microcontroller 82 instructs speech chip 130 to generate a cooing sound at speaker 176. The attention key 204d must then be reinserted in slots 198 and 200 in order to end the attention period. If the attention key 204d is not reinserted or if any other key is inserted, the crying sound will continue. Upon insertion of the attention key 204d into slots 198 and 200, the microcontroller 82 will instruct speech chip 130 to terminate the crying sounds at speaker 176, and thereafter, to generate a cooing sound.

If, for some reason, a student cannot determine how to stop the crying sound generated by the circuitry 80, a panic key (not shown) is provided which can be inserted into slots 198 and 200 in simulator 14, in order to provide a digital signal to microcontroller 82 that instructs microcontroller 82 to terminate the present programmed event, i.e. diaper change, feed and burp, or attention. However, when the panic key is inserted in slots 198 and 200, microcontroller generates a signal at pin 1 causing the tamper/panic LED 146 to start flashing. Further, the panic key will only terminate the present period (e.g. diaper change, feed and burp, or attention). The selected program will continue as the tamper/panic LED 146 continues to flash.

In order to stop the flashing of the tamper/panic LED 146, the instructor must insert a teacher reset key (not pictured) into slots 198 and 200 of simulator 14. Upon receipt of the teacher reset key in slots 198 and 200, a digital signal is sent to microcontroller 82 which causes microcontroller 82 to terminate the flashing of the tamper/panic LED.

If mannequin 12 is held or positioned incorrectly, mercury switch 86 will close thereby causing pin 17 to go high which, in turn, causes microcontroller 82 to instruct speech chip 130 generate a crying sound at speaker 176. However, to allow for normal handling, microcontroller 82 provides for a ten second delay before instructing speech chip 130 to generate the crying sound at speaker 176.

In a preferred embodiment, mannequin 12 must be positioned on its back during sleep or microcontroller 82 will cause speech chip 130 to generate a crying sound at speaker 176. Similarly, mannequin 12 must be in an upright position or on its back when being held or microcontroller 82 will instruct speech chip 130 to generate a crying sound at speaker 176. In order to facilitate handling during the diaper change, feeding and burping and attention periods, microcontroller 82 will not monitor the position of mannequin 12 during such periods.

If the mannequin 12 is abused, such as by dropping or hitting, toggle switch 102 will pivot as shown in phantom in FIG. 12 and close thereby causing pins 4 and 14 to switch state which, in turn, causes microcontroller 82 to instruct speech chip 130 to generate a crying sound at speaker 176. The crying sound cannot be stopped by the student during the first minute after the abusive activity. After one minute, the student can terminate the crying sound by inserting the attention key 204d into slots 198 and 200 as previously described.

In addition to generating the crying sound in response to abuse, microcontroller 82 generates a signal at pin 1 causing the tamper/panic LED 146 to start flashing. The flashing cannot be stopped by the student, only by the insertion of the teacher reset key into slots 198 and 200 of simulator 14 as described above. However, after the abuse has taken place, the selected program will continue normally.

In order to prevent tampering with the circuitry 80, tamper switch 90 is provided. Tamper switch 90 is in the form of a magnetic switch which is maintained in a normally opened position by magnet 41 when simulator 14 is received within cavity 28 in the back 30 of mannequin 12. If a student attempts to remove simulator 14 from cavity 28 in mannequin 12, magnetic switch 90 will close thereby causing microcontroller 82 to generate a signal at pin 1 such that tamper/panic LED 146 will start to flash. As previously described, only the insertion of the teacher reset key into slots 198 and 200 of simulator 14 can stop the flashing of the tamper/panic LED 146.

It is contemplated as being within the scope of the present invention to program microcontroller 82 to generate the crying and cooing sounds for predetermined lengths of time. It is further contemplated that the program keys 202a–d and the response keys 204a–d may be removed immediately after insertion into slots 198 and 200.

It is contemplated as being within the scope of the present invention to provide a student responsive sheet designed to allow the students to keep track of the type of care required by the infant simulation system, as well as the time at which the care was given. In that the events occur at predetermined time periods, a teacher correction template may be constructed in order to check the activities performed by the student versus the program for grading purposes or the like.

Various modes of carrying out the invention are contemplated as being within the scope of the following claims particularly pointing out and distinctly claiming the subject matter which is regarded as the invention.

We claim:

1. A device for simulating an infant, comprising:

a mannequin;

a control module positioned within the mannequin for generating one of a plurality of simulated activities by the mannequin;

a plurality of similarly configured response elements separate from the mannequin and the control module, wherein each response element corresponds to one of the simulated activities; and a reader element operatively connected to the control module and configured for engagement by the response elements, wherein the control module is operable to terminate each of the plurality of simulated activities in response to engagement with the reader element of a response element which corresponds to the simulated activity.

2. The device of claim 1 further comprising an abuse indicator interconnected to the mannequin, the abuse indicator generating a signal in response to a predetermined force on the mannequin.

3. The device of claim 2 wherein the abuse indicator includes a toggle switch movable between a first, normal operating position and a second, abused position in response to a predetermined force on the mannequin.

4. The device of claim 3 wherein the abuse indicator further includes a light emitting diode for generating a signal in response to movement of the toggle switch to the second, abused position.

5. The device of claim 3 wherein the abuse indicator further includes a sound generator for generating an audible abuse signal in response to movement of the toggle switch into the second, abused position.

6. The device of claim 5 wherein one of the plurality of response elements constitutes an attention element, wherein engagement of the attention element with the reader element terminates the audible abuse signal after a predetermined period.

7. The device of claim 1 wherein one of the plurality of response elements constitutes a panic element, wherein receipt of the panic element with the reader element terminates each of the simulated activities.

8. The device of claim 7 wherein the control module generates a panic signal in response to engagement of the panic element with the reader element.

9. The device of claim 1 further comprising a power source for supplying power to the control module at a predetermined level.

10. The device of claim 9 wherein the power source is a battery.

11. The device of claim 9 further comprising a low power indicator operatively connected to the power source, the low power indicator generating a visual signal in response to the power supplied decreasing below the predetermined level.

12. A device for simulating an infant, comprising:

a mannequin including wall structure defining a recess;

a control module positioned within the recess for generating a plurality of simulated activities by the mannequin;

a response arrangement operatively connected to the control module for terminating the plurality of simulated activities; and a tamper indicator including a first member interconnected with the wall structure and a second member interconnected with the control module, wherein the first and second members interact to generate a tamper signal in response to removal of the control module from the recess.

13. The device of claim 12 wherein the second member comprises a tamper switch movable between a first, normal operating position, and a second, tampered position in response to removal of the control module from the recess.

14. The device of claim 13 wherein the tamper indicator includes a light emitting diode for generating a signal in response to movement of the tamper switch to the second, tampered position.

15. The device of claim 14, wherein the first member comprises a magnet interconnected with the wall structure, and wherein the tamper switch comprises a magnetic switch which is movable to its second, tampered position in response to removal of the control module from the recess and separation of the magnetic switch from the magnet.

16. The device of claim 12 wherein the control module includes a microprocessor and a sound generating structure responsive to commands from the microprocessor.

17. The device of claim 12 wherein the response arrangement comprises a plurality of coded response elements, each response element generating a distinct signal corresponding to one of the simulated activities wherein receipt of a signal from one of the response elements by the control module terminates one of the plurality of simulated activities.

18. The device of claim 17 wherein one of the plurality of coded response elements constitutes a panic element, wherein the panic element generates a signal which terminates each of the simulated activities.

19. The device of claim 18 wherein the control module generates a panic signal in response to receipt of a signal from the panic element.

20. The device of claim 1 wherein the control module includes a microprocessor and a sound generating structure responsive to commands from the microprocessor.

21. The device of claim 20 wherein the reader element includes a plurality of switches operatively connected to the microprocessor of the control module, each switch movable between an opened and closed position.

22. The device of claim 21 wherein each response element includes a key having distinct, coded bitting thereon such that engagement of a response element with the reader element results in the closing of a unique, corresponding combination of switches of the reader element.

23. The device of claim 1 wherein the control module and reader element are housed in a housing, the housing having a slot therein so as to allow for insertion of a response element.

24. The device of claim 23 wherein the mannequin includes a cavity therein for receiving the housing.

25. The device of claim 24 further comprising a hook and pile element, one of said hook and pile element mounted to the housing while the other mounted within the cavity in the mannequin in order to maintain the housing within the cavity in the mannequin.

26. The device of claim 24 further comprising a flexible tab member extending from the housing so as to facilitate removal of the housing from the mannequin.

27. The device of claim 1 further comprising a sensor for monitoring the position of the mannequin and for providing a signal to the control module in response to the positioning of the mannequin in a predetermined, non-acceptable position, such that the control module generates a visual signal in response thereto.

28. The device of claim 1 wherein the control module generates a positive reinforcement signal in response to engagement with the reader element of a response element corresponding to the simulated activity.

29. The device of claim 1 wherein the control module generates a first sound when generating one of the plurality of simulated activities and a second sound when terminating the one of the plurality of simulated activities.

30. A device for simulating an infant, comprising:

a mannequin including wall structure defining a recess;

a control module positioned within the recess for generating one of a plurality of simulated activities by the mannequin;

an abuse indicator interconnected with the mannequin, the abuse indicator generating a signal in response to a predetermined force on the mannequin, and a tamper indicator interconnected with the mannequin, including a first member interconnected with the wall structure and a second member interconnected with the control module, wherein the first and second members interact to generate a tamper signal in response to removal of the control module from the recess.

31. The device of claim 30 wherein the abuse indicator includes a toggle switch movable between a first, normal operation position and a second, abused position in response to a predetermined force on the mannequin.

32. The device of claim 31 wherein the abuse indicator further includes a light emitting diode for generating a signal in response to movement of the toggle switch to the second, abused position.

33. The device of claim 31 wherein the abuse indicator further includes a sound generator for generating an audible abuse signal in response to movement of the toggle switch into the second, abused position.

34. The device of claim 30 wherein the second member comprises a tamper switch movable between a first, normal operating position, and a second, tampered position in response to removal of the control module from the recess and movement of the tamper switch away from the first member.

35. The device of claim 30 wherein the tamper indicator includes a light emitting diode for generating a signal in response to movement of the tamper switch to the second, tampered position.

36. The device of claim 30 wherein the control module includes a microprocessor and a sound generating structure responsive to commands from the microprocessor.

37. The device of claim 30 further comprising a plurality of coded response elements, each response element generating a distinct signal corresponding to one of the simulated activities, wherein the receipt of each signal from one of the response elements by the control module terminates one of the plurality of simulated activities.

38. The device of claim 37 wherein one of the plurality of coded response elements constitutes a panic element, wherein the panic element generates a signal which terminates each of the simulated activities.

39. The device of claim 38 wherein the control module generates a panic signal in response to receipt of a signal from the panic element.

40. A method for simulating the activities of an infant, comprising the steps of:

providing a mannequin;

generating one of a plurality of simulated activities by the mannequin at time intervals;

selecting a response element from one of a plurality of similarly configured response elements separate from the mannequin, wherein each response element corresponds to one of the simulated activities;

and terminating the one of the plurality of simulated activities with the selected response element.

41. The method of claim 40 further comprising the additional step of generating a visual signal in response to a predetermined force on the mannequin.

42. The method of claim 40 further comprising the additional step of generating an audible signal in response to a predetermined force on the mannequin.

43. The method of claim 42 comprising the further step of terminating the audible signal with a selected response element.

44. The method of claim 40 further comprising the additional step of providing a panic element and generating a signal with the panic element so as to terminate all of the simulated activities.

45. The method of claim 44 further comprising the additional step of generating a panic signal in response to the terminating of a simulated activity with the panic element.

46. The method of claim 40 further comprising the additional step of supplying power for generating the one of the plurality of simulated activities by the mannequin.

47. The method of claim 46 further comprising the additional step of monitoring the power supplied and generating a signal in response to the power decreasing below a predetermined level.

48. The method of claim 40 further comprising the additional step of generating the one of the plurality of simulated activities by the mannequin according to a program.

49. The method of claim 48 further comprising the additional step of providing a plurality of programs for generating the one of the plurality of simulated activities by the mannequin.

50. The method of claim 49 further comprising the additional step of selecting one of the plurality of programs.

51. An infant simulation device, comprising:

a mannequin;

a control module interconnected with the mannequin for generating a first output indicative of a simulated activity by the mannequin, wherein the simulated activity has a time period;

a response arrangement engageable with the control module for terminating the first output for the simulated activity; and wherein the control module is operable to generate a second output distinct from the first output in response to termination of engagement of a correct one of the response elements with the control module for the simulated the first output by the response arrangement, and wherein the control module is further operable to generate the second output toward the end of the time period of the simulated activity, and to generate the first output after the time period of the simulated activity if the response arrangement is not engaged with the control module subsequent to generation of the second output toward the end of the time period of the simulated activity.

52. The infant simulation device of claim 51, wherein the first output comprises a crying sound and wherein the second output comprises a cooing sound.

53. An infant simulation device, comprising:

a mannequin including a receiver;

a control arrangement within the mannequin and including an audible generator for outputting a crying sound at intervals, wherein the crying sound corresponds to one of a plurality of conditions having a time period;

a plurality of response elements selectively engageable with the receiver, wherein each response element is operable to interact with the control arrangement to silence the crying sound for one of the plurality of conditions; and wherein the control arrangement is operable to silence the crying sound and output a positive feedback sound through the audible generator when the correct response element is engaged with the receiver for the condition to which the crying sound corresponds, and wherein the control module is further operable to output a sound toward the end of the time period of the condition, and to output the crying sound at the end of the time period if the response element is not engaged with the control module subsequent to output of the sound toward the end of the time period of the condition.

54. A method of simulating the activities of an infant, comprising the steps of:

providing a mannequin;

generating a first output from the mannequin indicative of commencement of an activity having a time period;

manipulating a response element with the mannequin so as to terminate the first output;

generating a second output distinct from the first output toward the end of the time period of the activity; and generating an output at the end of the time period of the activity if the response element has not been manipulated with the mannequin subsequent to the second output.

55. The method of claim 54, wherein the first output comprises a crying sound and wherein the second output comprises a positive feedback sound.

56. The method of claim 54, wherein the step of manipulating a response element with the mannequin comprises engaging one of a plurality of response elements with a control module associated with the mannequin and which is operable to generate the first and second outputs.

57. An infant simulation device, comprising:

a mannequin including a receiver;

a control arrangement associated with the mannequin and including an audible generator, wherein the control arrangement is operable to output a crying sound at predetermined intervals, wherein the crying sound corresponds to one of a plurality of conditions; and a plurality of response elements separate from the mannequin and selectively engageable with the control arrangement, wherein each response element is operable to interact with the control arrangement to silence the crying sound for one of the plurality of conditions.

58. The infant simulation device of claim 57, wherein the predetermined intervals of the crying sounds are programmed within the control arrangement, and further comprising a program selection arrangement engageable with the control arrangement for enabling an operator to select a predetermined pattern of crying sounds.

59. The infant simulation device of claim 58, wherein the response elements comprise a first set of response elements adapted for assignment to a student for engagement with the receiver to silence the crying sounds during use, and wherein the program selection arrangement comprises a set of elements adapted for use by an instructor for use in selecting one of the predetermined patterns of crying sounds.

60. The infant simulation device of claim 59, further comprising a record for use by the student to record the times and durations of the conditions, and a template for use by the instructor in determining the correctness of the record.

* * * * *

UNITED STATES PATENT AND TRADEMARK OFFICE
CERTIFICATE OF CORRECTION

PATENT NO. : 6,050,826
DATED : April 18, 2000
INVENTOR(S) : DANIEL C. CHRISTIANSON ET AL It is certified that error appears in the above-identified patent and that said Letters Patent is hereby corrected as shown below:

ON THE FACE

[56] References Cited - Other Publications: Add -- Jarrat Love Eggs --

IN THE CLAIMS

CLAIM 7, column 11, line 35, delete "receipt" and substitute therefore -- engagement --;
CLAIM 51, column 14, lines 39-41, delete "engagement of a correct one of the response elements with the control module for the simulated".

Signed and Sealed this

Seventeenth Day of April, 2001

Attest:

NICHOLAS P. GODICI

Attesting Officer     Acting Director of the United States Patent and Trademark Office